United States Patent [19]

Krabbenhoft et al.

[11] Patent Number: 5,212,284

[45] Date of Patent: May 18, 1993

[54] CONVERSION OF CYCLIC POLYCARBONATE OLIGOMERS TO LINEAR POLYCARBONATES INITIATED BY PHOSPHINE-DISULFIDE PRODUCT OR PRECURSOR THEREOF

[75] Inventors: Herman O. Krabbenhoft; Daniel J. Brunelle, both of Scotia, N.Y.

[73] Assignee: General Electric Company, Schenectady, N.Y.

[21] Appl. No.: 826,503

[22] Filed: Jan. 27, 1992

[51] Int. Cl.⁵ .............................................. C08G 64/20
[52] U.S. Cl. ..................................... 528/371; 528/198; 528/370
[58] Field of Search .................. 528/371, 370, 198

[56] References Cited

PUBLICATIONS

Krabbenhoft, U.S. patent application Ser. No. 07/656,347, filed Feb. 15, 1991.

*Primary Examiner*—Harold D. Anderson
*Attorney, Agent, or Firm*—William H. Pittman

[57] ABSTRACT

Cyclic polycarbonate oligomers are polymerized to linear polycarbonates by the action of a salt prepared by the reaction of a triarylphosphine or triaryl phosphite with an organic disulfide, preferably an aryl disulfide. The reactants which form the salt may be incorporated in the cyclic polycarbonate composition, and interreact when the composition is heated to form the active initiating species.

20 Claims, No Drawings

CONVERSION OF CYCLIC POLYCARBONATE OLIGOMERS TO LINEAR POLYCARBONATES INITIATED BY PHOSPHINE-DISULFIDE PRODUCT OR PRECURSOR THEREOF

This invention relates to the preparation of linear polycarbonates and similar condensation polymers, and more particularly to a method for their preparation from cyclic oligomer compositions.

The conversion of low molecular weight cyclic aromatic carbonate polymers to linear polycarbonates is known. Reference is made, for example, to the following U.S. patents:

| | |
|---|---|
| 3,155,683 | 3,386,954 |
| 3,274,214 | 3,422,119. |

More recently, cyclic polycarbonate oligomer mixtures have been prepared and converted to linear polycarbonates, often of very high molecular weight, by contact with a wide variety of polycarbonate formation initiators, also sometimes designated "catalysts". Reference is made, for example, to U.S. Pat. Nos. 4,644,053 and 4,740,583, the disclosures of which are incorporated by reference herein.

Many of the initiators used to convert cyclic polycarbonates to linear polymers have relatively rapid action. This is, of course, often desirable, since there is frequently nothing gained by prolonging the polymerization reaction.

Under certain conditions, however, it is necessary for the melt viscosity of the cyclic polycarbonate composition to remain relatively low for some time. An example is pultrusion, in which a continuous fiber yarn is impregnated with resinous material or resin precursor(s) and subsequently extruded under conditions which promote curing or polymerization. Maintenance of low melt viscosity for a period sufficient to wet the continuous fibers is required. Thereafter, it is desirable for conversion to linear polycarbonates to be as rapid as possible.

Another such operation is reaction injection molding (RIM), in which two interractive polymer or polymer precursor streams are charged to a mold which is heated to a temperature at which reaction between said streams takes place to form a molded article. The contents of each stream should be stable and non-reactive within itself. However, reaction between the two streams, resulting in curing or polymerization, should take place promptly upon mixing.

For operations of this type, a two-component initiator system for polymerization of cyclic polycarbonate oligomers is desired. Such a system is provided by the present invention. Such a system is disclosed and claimed in copending, commonly owned application Ser. No. 07/656,347; it is prepared from a triarylphosphine and an alkyl or acyl halide, which apparently undergo reaction to form a Wittig salt which is the actual initiating species. A disadvantage of such systems, however, is their halide content, since halide ions tend to degrade polycarbonates.

The present invention provides a halide-free two-component initiator system for conversion of cyclic to linear polycarbonates. Said system may be employed in any polymerization environment where polymerization only above a specific threshold temperature is desired.

In one of its aspects, therefore, the invention includes a method for preparing a resinous composition which comprises contacting, at a temperature in the range of about 280°-350° C., at least one cyclic polycarbonate oligomer with an effective amount to initiate polymerization of a two-component initiator precursor system comprising (A) at least one organic disulfide, (B) at least one triarylphosphine or triaryl phosphite which is capable of reaction with component A to form a salt, the molar ratio of reagent A to reagent B being in the range of about about 1-5:1, and any reaction products of reagents A and B.

The cyclic polycarbonate oligomer compositions useful in the method of this invention generally comprise a plurality of structural units of the formula

wherein at least about 60% of the total number of $R^1$ values are divalent aromatic organic radicals, the balance thereof being aliphatic, alicyclic or aromatic organic radicals. Such compositions include dimers, trimers and tetramers, as well as cyclic polycarbonate oligomer mixtures.

The $R^1$ values may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 80% of the total number of $R^1$ values in the cyclic oligomer mixtures, and most desirable all of said $R^1$ values, are aromatic. The aromatic $R^1$ radicals preferably have the formula

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gemalkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 5% of such linear oligomers, if any, are present.

The mixtures also usually contain low percentages, if any, of polymers (linear or cyclic) having a degree of polymerization greater than about 30. For the purposes of this invention, which often require relatively very low viscosities at the temperatures at which the oligomers are liquid, it is usually preferred and sometimes essential for the proportion of such polymers having a high degree of polymerization to be low, generally no higher than about 5%. Removal of such polymers, when necessary, is easily achieved by precipitation with a non-solvent, as disclosed, for example, in the aforementioned U.S. Pat. No. 4,644,053.

According to the present invention, conversion of the cyclic polycarbonates to linear polycarbonates is effected by contact with the above-identified two-component initiator precursor system. Reagent A therein is at least one organic disulfide, which may be aliphatic, alicyclic or aromatic and which may contain substituents which do not interfere with the reactions disclosed herein. Suitable disulfides may be represented by the formula $R^2$—S—S—$R^2$, wherein $R^2$ is an organic (i.e., aliphatic, alicyclic or aromatic) radical, preferably a hydrocarbon radical although substituted hydrocarbon radicals are also within the scope of the invention.

It is generally desirable, by reason of the temperature at which the conversion of cyclic to linear polycarbonate is conducted, for reagent A to have a boiling point at 760 torr of at least about 150° C. Aromatic disulfides are particularly preferred, with phenyl disulfide being most preferred by reason of its availability and particular suitability.

Reagent B is at least one triarylphosphine or triaryl phosphite wherein the aryl groups may be unsubstituted or substituted. Suitable compounds, hereinafter sometimes designated "trivalent phosphorus reagents", may be represented by the formula $[A^3(O)_y]_3P$, wherein $A^3$ is an unsubstituted or substituted aryl group and y is 0 or 1.

Among the substituents which may be present in reagent B, those which are electron-withdrawing are preferred, since electron-donating substitutents can increase the reactivity of the trivalent phosphorus reagent to the point where it alone serves as a initiator for ring-opening of cyclic polycarbonate oligomers. The electron-withdrawing substituents whose presence on the aromatic rings has been found most satisfactory include chloro and fluoro groups. Only one substituent per aromatic ring should usually be present, and it is preferably located in the para position with respect to the phosphorus or oxygen atom. The preferred aryl groups are $C_{6-10}$ hydrocarbon groups and especially phenyl. Triphenylphosphine is especially preferred as reagent B.

It is known in the art that compounds of the type represented by reagents A and B react under proper conditions to form triaryl- or triaryloxythioorganophosphonium thiophenoxides. Accordingly, another aspect of the invention is a method for converting cyclic polycarbonate oligomers to linear polycarbonates in accordance with the foregoing, by contact with an initiating amount of at least one triaryl- or triaryloxythioorganophosphonium thiophenoxide of the formula

$$[A^3(O)_y]_3P^{\oplus}\text{—}SR^2\ominus S\text{—}R^2, \qquad (III)$$

wherein $A^3$, $R^2$ and y are as previously defined.

The fact that it is the reaction products of reagents A and B which are the effective initiating species in accordance with the present invention has been demonstrated experimentally. It was shown, first, that a mixture of bisphenol A cyclic polycarbonate oligomers and 0.26 mole percent, based on structural units in said oligomers, of phenyl disulfide did not undergo substantial ring-opening polymerization when heated for 30 minutes at 300° C. This was demonstrated by the fact that the treated mixture gave, upon solvent casting, non-integral, highly cracked and very brittle films—properties characteristic of the cyclic oligomers themselves rather than of linear polycarbonates. The same was true of an oligomer mixture containing 0.23 mole percent triphenylphosphine, which was shown by analysis to produce only 35% linear polycarbonate having a molecular weight of only about 35,000. By contrast, a mixture of 0.33 mole percent each of triphenylphosphine and phenyl disulfide initiated polymerization, producing a polymer of molecular weight about 92,000. Similarly, a control experiment utilizing 0.22 mole percent of tetrabutylammonium tetraphenylborate (a known cyclics polymerization initiator) afforded a clear, integral, tough film consisting entirely of linear polycarbonate having a weight average molecular weight of 92,000.

It is apparent from formula III that the reaction which forms the salt takes place between equimolar amounts of reagents A and B. It is possible, therefore, to employ said reagents in substantially equimolar amounts in the cyclic polycarbonate oligomer composition to be polymerized. It is sometimes preferred, however, to employ reagent A in excess, in order to drive the salt-forming reaction to completion. The molar ratio of reagent A to reagent B is generally in the range of about 1-5:1. Any excess should be of reagent A by reason of its minimal tendency to initiate cyclics polymerization by itself.

The polymerization reaction is typically conducted by merely contacting the cyclic oligomers with the initiator species (i.e., the salt) or the precursors thereof (i.e., reagents A and B) at a temperature in the range of about 280°-350° C., preferably about 300°-325° C., until polymerization has proceeded to the extent desired. Although a solvent may be used, it is not necessary and is frequently not preferred. It is within the scope of the invention to conduct the polymerization in a mold to produce a molded article, or in an extruder or pultrusion apparatus to produce a linear polycarbonate with or without reinforcement such as glass fibers.

Compositions comprising cyclic oligomers of formula I and at least one salt of formula III or precursors thereof as described hereinabove may be prepared by dissolving the cyclic compositions in a suitable solvent, preferably methylene chloride, to which the salt precursors are added in the desired proportions. The solvent is then evaporated to reduce an intimate blend of the initiator precursors with the cyclic composition. Such blend is stable at ambient temperatures, as are blends of cyclics with either component A or component B. However, a blend of cyclics with both component A and B may be polymerized by heating to an appropriate temperature. Polymerizable compositions of this type are another aspect of the invention.

The proportion of initiator, or precursors thereof, used in the method of this invention will depend to some extent on the molecular weight of the polymer desired and the time available for completion of the polymerization reaction. Since a "living" polymerization is involved, the molecular weight of the polymer will vary inversely with the proportion of initiator or precursors used. On the other hand, the reaction rate varies directly with the proportion of initiator. Therefore, as said proportion is increased, the time required for polymerization and the molecular weight of the product both decrease. Balancing these factors, it is generally found that proportions of reagents A and B in the amounts of about 0.01-1.0 mole percent, based on structural units in the oligomers, are satisfactory.

The invention is illustrated by the following examples in which the cyclic polycarbonate composition used in each example was a mixture of bisphenol A cyclic polycarbonate oligomers, principally having degrees of polymerization from 2 to about 6 and substantially free from linear polycarbonate; molar proportions thereof are in terms of carbonate units. Molecular weights were determined by gel permeation chromatography relative to polystyrene.

EXAMPLES 1-7

Solutions in methylene chloride of cyclic polycarbonate oligomers and various proportions of phenyl disulfide (PDS) and triphenylphosphine (TPP) were prepared and evaporated to dryness in vacuum. The resulting dry mixtures were thoroughly pulverized with a spatula and 2.55-gram samples thereof were placed in a flask which was evaporated and heated at 300° C. in a salt bath for a specified period of time. The contents of the flask were allowed to cool, after which nitrogen and then air were allowed to bleed in. The products were dissolved in 30 ml. of methylene chloride and the solutions were filtered through a cotton plug and allowed to evaporate, whereupon cast polycarbonate films were obtained; they were inspected visually to determine their condition. A second portion of each filtrate was analyzed to determine molecular weight and degree of polymerization. The results are given in the following table.

| Example | Initiator, mole % | | Time, min. | Polymer | |
| --- | --- | --- | --- | --- | --- |
| | PDS | TPP | | % | Mw |
| 1 | 0.05 | 0.05 | 10 | 19 | 18,600 |
| 2 | 0.05 | 0.05 | 20 | 34 | 40,000 |
| 3 | 0.10 | 0.10 | 10 | 26 | 28,100 |
| 4 | 0.10 | 0.10 | 20 | 70 | 82,700 |
| 5 | 0.20 | 0.20 | 10 | 63 | 75,200 |
| 6 | 0.20 | 0.20 | 20 | 74 | 93,100 |
| 7 | 0.40 | 0.10 | 10 | 65 | 74,400 |

What is claimed is:

1. A method for preparing a resinous composition which comprises contacting, at a temperature in the range of about 280°-350° C., at least one cyclic polycarbonate oligomer with an effective amount to initiate polymerization of an initiator precursor system comprising (A) at least one organic disulfide, (B) at least one triarylphosphine or triaryl phosphite which is capable of reaction with reagent A to form a salt, the molar ratio of reagent A to reagent B being in the range of about 1-5:1, and any reaction products of reagents A and B.

2. A method according to claim 1 wherein the cyclic polycarbonates comprise a plurality of structural units of the formula

wherein at least about 60% of the total number of $R^1$ values are divalent aromatic organic radicals, the balance thereof being aliphatic, alicyclic or aromatic organic radicals.

3. A method according to claim 2 wherein the molar ratio of reagent A to reagent B is in the range of about 1-5:1.

4. A method according to claim 3 wherein reagent A is an aromatic disulfide.

5. A method according to claim 3 wherein reagent B is triphenylphosphine.

6. A method according to claim 3 wherein each of reagents A and B is present in the amount of about 0.01-1.0 mole percent, based on structural units in the oligomer composition.

7. A method according to claim 3 wherein each $R^1$ radical has the formula

wherein each of $A^1$ and $A^2$ is a monocyclic divalent aromatic radical and Y is a bridging radical in which one or two atoms separate $A^1$ from $A^2$.

8. A method according to claim 7 wherein $A^1$ and $A^2$ are each p-phenylene and Y is isopropylidene.

9. A method for preparing a resinous composition which comprises contacting, at a temperature in the range of about 280°-350° C., at least one triaryl- or triaryloxythioorganophosphonium thiophenoxide of the formula

wherein $R^2$ is an organic radical, $A^3$ is an unsubstituted or substituted aryl group and y is 0 or 1.

10. A method according to claim 9 wherein $R^2$ is an aromatic radical, $A^3$ is phenyl and y is 0.

11. A polymerizable composition comprising cyclic polycarbonate oligomers comprising structural units of the formula $$-O-R^1-O-\overset{O}{\underset{\|}{C}}-, \tag{I}$$

wherein at least about 60% of the total number $R^1$ values are divalent aromatic organic radicals, the balance thereof being aliphatic, alicyclic or aromatic organic radicals; and an initiator system comprising (A) at least one organic disulfide, (B) at least one triarylphosphine or triaryl phosphite which is capable of reaction with reagent A to form a salt, the molar ratio of reagent A to reagent B being in the range of about 1–5:1, and any reaction products of reagents A and B.

12. A composition according to claim 11 wherein the cyclic polycarbonates comprise a plurality of structural units of the formula $$-O-R^1-O-\overset{O}{\underset{\|}{C}}-, \tag{I}$$

wherein at least about 60% of the total number of $R^1$ values are divalent aromatic organic radicals, the balance thereof being aliphatic, alicyclic or aromatic organic radicals.

13. A composition according to claim 12 wherein the molar ratio of reagent A to reagent B is in the range of about 1–5:1.

14. A composition according to claim 13 wherein reagent A is an aromatic disulfide.

15. A method according to claim 13 wherein reagent B is triphenylphosphine.

16. A composition according to claim 13 wherein each of reagents A and B is present in the amount of about 0.001–1.0 mole percent, based on structural units in the oligomer composition.

17. A composition according to claim 13 wherein each $R^1$ radical has the formula $$-A^1-Y-A^2-, \tag{II}$$

wherein each of $A^1$ and $A^2$ is a monocyclic divalent aromatic radical and Y is a bridging radical in which one or two atoms separate $A^1$ from $A^2$.

18. A composition according to claim 17 wherein $A^1$ and $A^2$ are each p-phenylene and Y is isopropylidene.

19. A polymerizable composition comprising cyclic polycarbonate oligomers comprising structural units of the formula $$-O-R^1-O-\overset{O}{\underset{\|}{C}}-, \tag{I}$$

wherein at least about 60% of the total number of $R^1$ values are divalent aromatic organic radicals, the balance thereof being aliphatic, alicyclic or aromatic organic radicals; and at least one triaryl- or triaryloxythioorganophosphonium thiophenoxide of the formula $$[A^3(O)_y]_3P^\oplus-SR^2{}^\ominus S-R^2, \tag{III}$$

wherein $R^2$ is an organic radical, $A^3$ is an unsubstituted or substituted aryl group and y is 0 or 1.

20. A composition according to claim 19 wherein $R^2$ is phenyl, $A^3$ is phenyl and y is 0.

* * * * *